United States Patent [19]

Pichl

[11] Patent Number: 4,483,268

[45] Date of Patent: Nov. 20, 1984

[54] METHOD OF MANUFACTURING BOAT PARTS SUBMERGED WHEN IN USE, AND PART PRODUCED BY THE METHOD

[75] Inventor: Heinz Pichl, Upsala, Sweden

[73] Assignee: Volvo Penta AB, Gothenburg, Sweden

[21] Appl. No.: 379,350

[22] Filed: May 18, 1982

[30] Foreign Application Priority Data

May 21, 1981 [SE] Sweden ............................. 8103204

[51] Int. Cl.³ ............................................. B63B 5/24
[52] U.S. Cl. .................................... 114/65 R; 440/78; 440/49; 264/271.1; 264/273; 416/229 R; 416/241 A
[58] Field of Search ................. 114/65 R, 357, 74, 79; 264/270, 271, 273; 416/241 A, 229, 230; 440/71, 76, 77, 78

[56] References Cited

U.S. PATENT DOCUMENTS 2,454,200 11/1948 Perkins ............................ 416/241 A
3,153,397 10/1964 Mattson et al. ........................ 440/76
4,304,533 12/1981 Buckell ............................ 264/271.1

FOREIGN PATENT DOCUMENTS 124253 3/1919 United Kingdom ........... 416/241 A
412300 6/1934 United Kingdom ................ 114/357

Primary Examiner—Trygve M. Blix
Assistant Examiner—Patrick W. Young
Attorney, Agent, or Firm—Arthur G. Yeager

[57] ABSTRACT

A method of manufacturing boat parts submerged when in use comprises producing a metallic skeleton structure shaped for easiest production by conventional metal-forming methods, and covering this structure in a mold with an adhering layer or coating of a thermoplastic resin or a rubber-based vulcanizable substance. The inner walls of the mold have high finish and the desired streamlined outer shape of the finished product, such as a lower unit of a propulsion system, or a propeller and the like. The coating functionally neutralizes the technologically conditioned and generally not streamlined shapes of the skeleton structure and provides a protection of the skeleton structure against electroerosive corrosion.

14 Claims, 11 Drawing Figures

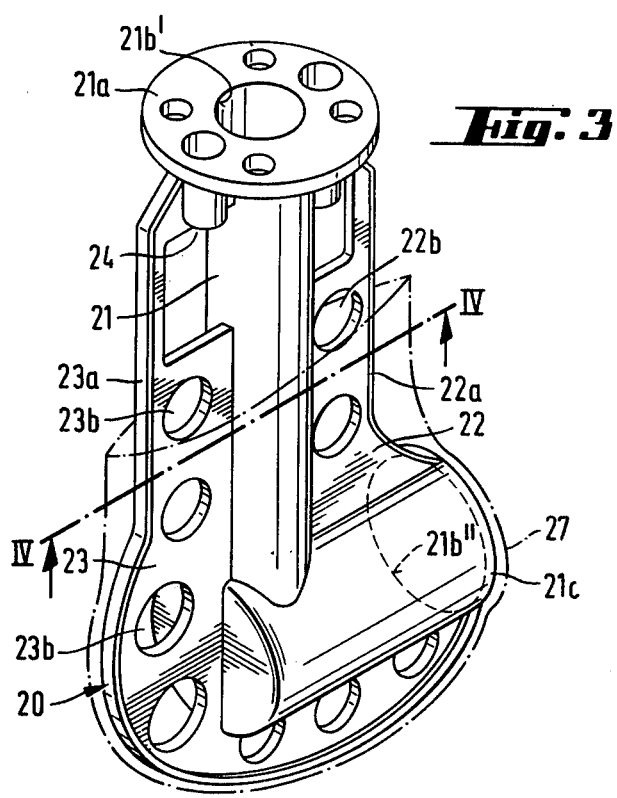
*Fig: 3*
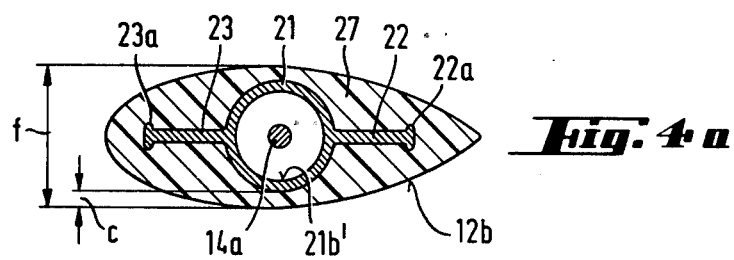
*Fig: 4a*
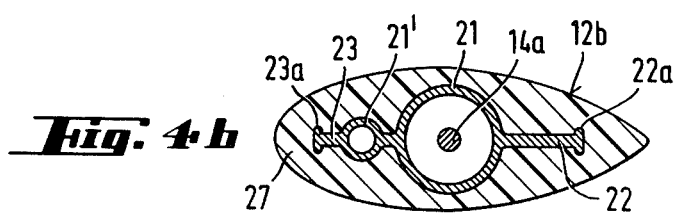
*Fig: 4b*

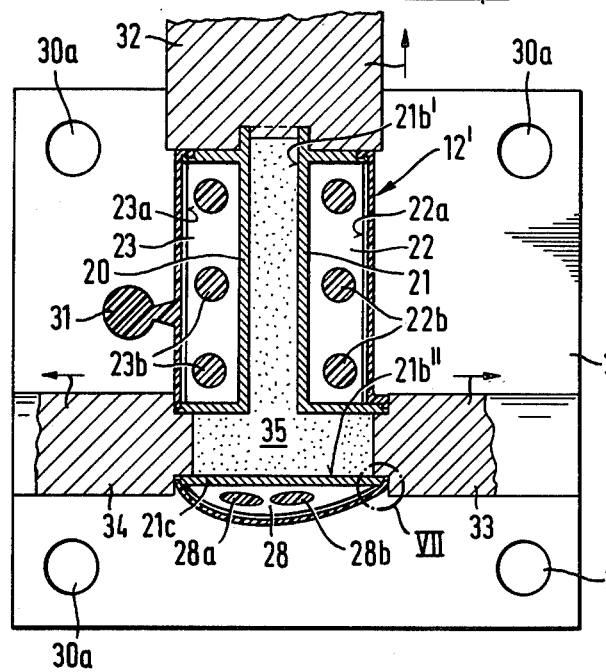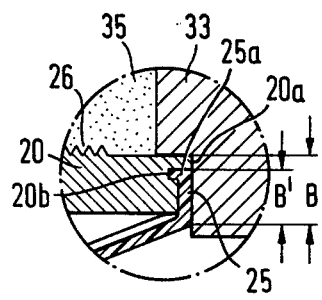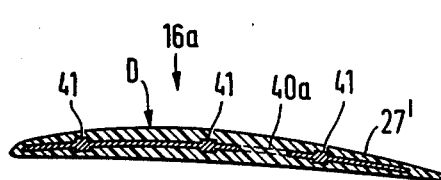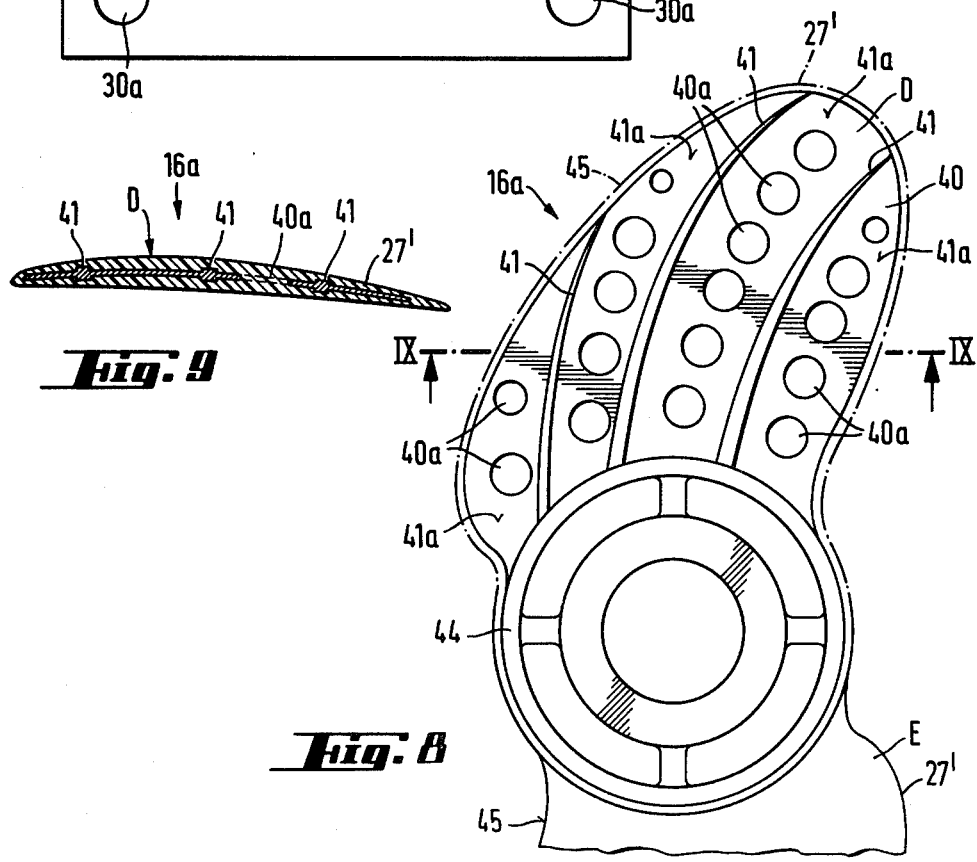

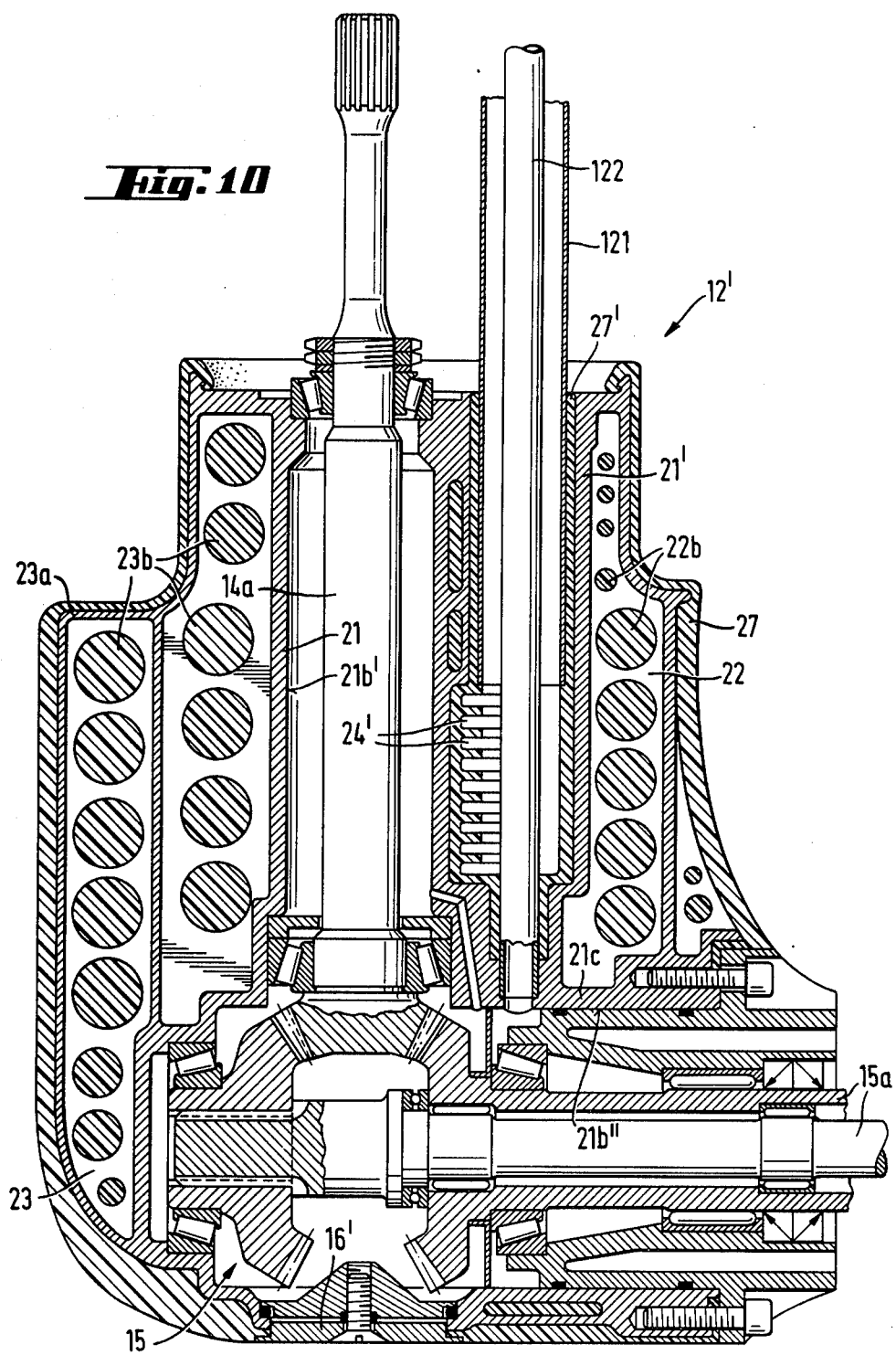

METHOD OF MANUFACTURING BOAT PARTS SUBMERGED WHEN IN USE, AND PART PRODUCED BY THE METHOD

BACKGROUND OF THE INVENTION

The invention relates generally to a method of manufacturing boat parts submerged when in use (i.e. so called "wet" or underwater parts) such as rudder plates, propellers, lower units of outboard motors and of inboard-outboard motors etc., and to parts manufactured by the method.

Conventionally, such parts are produced of metallic materials such as iron, zinc or aluminum by molding or diecasting and they are, depending on the material used, provided with several surface conditioning layers of varying character, such as zinc coatings, chromating layers, primer layers, paint coatings etc. To apply a plurality of such layers is expensive, among other things also because relatively long waiting times may be necessary between two subsequent applications, to allow the underlying layer first to dry properly.

However, in spite of the presence of a plurality of surface conditioning layers, it cannot be excluded that after a certain time of service, or when hitting an underwater obstacle, a defect or fault arises exposing a bare metallic surface to water. Thereby arises the risk of corrosion by an electroerosive process taking place between the exposed spot and some other submerged bare metallic part, even if the involved metals may not be susceptible to corrosion by oxidation. Not even sailing boats with hulls of wood or plastics are exempt, because they mostly have keels comprising ballast metal (iron) and electroerosion may occur between this metal and e.g. an auxiliary outboard motor made mainly of aluminum.

It will be readily understood that submerged parts of a boat must be as much streamlined as possible. Said conventional surface conditioning layers, irrespective of their character and number, can always create only a uniformly thick coating on the underlying metallic surface, so that this surface in general must have the final shape of the respective part called for by hydrodynamic reasons, i.e. a streamlined shape. Moulding and diecasting processes do not allow greater differences in wall thickness (and such differences in a metallic object would also cause a considerable increase in weight) so that the inner walls of all underwater parts having a cavity, such as the lower units of outboard or inboard-outboard drive units, must generally follow the streamlined shape of the outer walls. Because of this, relatively complex mandrels or mold cores, often more than one, must be used in order to obtain the necessary streamlined outside shape of a casting which then may be covered by uniformly thick surface conditioning coatings.

Attention is directed to German patent specification No. 360952, issued Oct. 9, 1922, to Zeppelin-Werke G.m.b.H. and Albert Lehrle, and which discloses a settable ship's propeller of aluminum, and to Swiss patent specification No. 527680, issued Sept. 15, 1972, to Société Nationale Industrielle Aérospatiale, which discloses a method of covering a structure having a cavity with a layer of a liquid substance capable of being hardened.

SUMMARY OF THE INVENTION

There is provided in accordance with the invention a method that solves the problems discussed above. This is accomplished by producing by conventional metalforming techniques such as molding, diecasting or welding a metallic skeleton structure having an outer shape, defined by its outer walls, which is fully included in the final shape of the respective boat part, but which differs therefrom not only by smaller dimensions, but mainly by the fact that it in greatest possible extent is adapted to answer to the demands of convenient and economic production by e.g. molding or diecasting, generally disregarding all other aspects, including streamlining. In particular in the case of parts such as the lower units of marine propulsion assemblies which have an internal cavity, economic and convenient production demands that only simple and few cores are needed to be used, e.g. only one or two cylindrical cores. With a view to the already mentioned necessity to have in a metal cast uniformly thick walls, also the outer walls of the cast will then be more or less cylindrical. The general shape of a hollow cylinder has further the advantage of being highly resistant to outer pressure, as it well may be defined as being constructed according to known principles of shell construction. The importance of this fact in the present context will become clear later. Even when the skeleton structure is produced by welding, the shape of one or more combined hollow cylinders is technologically advantageous.

This skeleton structure is thereafter inserted into a mold as if it were a core itself and a curable watertight and dielectric mass, being either a thermoplastic resin or a vulcanizable rubber-based substance, is introduced into the mold to fill out the empty spaces between the outer walls of the skeleton structure and the inner walls of the mold. Said inner walls are smooth (e.g. highly polished) and have generally (i.e. with due respect to possible shrinkage) the final shape of the manufactured part. The mass is in the mold cured in known manner, i.e. by lapse of time and change of its thermal condition (cooling or heating), so as to form a relatively thick layer or coating enveloping the structure and adhering thereto.

Emphasis has to be laid on the choice of the layer-forming material. Both thermoplastic resins and vulcanizable rubber-based substances have considerably shorter curing times (in the order of magnitude of minutes) than what the case is with thermosetting resins, and have at the same time dielectric qualities which are fully satisfactory from the point of view of preventing electroerosive corrosion.

However, an arbitrary skeleton structure with a cavity, e.g. the one shown in FIG. 1 in the above cited Swiss patent specification No. 527.680, might be destroyed by the relatively high pressure prevailing in the mold, if not special precautions were taken to prevent it. In the case of a thermoplastic resin, it is injected into the mold in a heated state and under a pressure of more than 150 kg/cm$^2$. In the case of a rubber material, pressure is developed in the mold during the curing process. According to the present invention, a skeleton structure having a cavity is either constructed in accordance with known shell construction principles, e.g. in the general form of one or more hollow cylinders, and/or the cavity is filled with some suitable and readily removable pressure resistant substance, liquid, sandy, or firm, e.g. a possibly modified duplicate of a core used in the manufacture of the skeleton structure.

Propellers made all of plastics material (with the exception of the hub portion) have already been proposed, but they are extremely difficult to produce in correct shape and pitch, due to contraction of the plastics material in the blades at and after curing. According to the present invention, the metallic skeleton structure reduces the amount of thermoplastic resin or vulcanizable rubber-based substance to be used, and thus also the degree of shrinkage, and further supports the coating during the period of curing and even thereafter. Moreover, a skeleton structure of one single type may be adapted for insertion in different molds to produce propellers with somewhat differing pitch and/or overall dimensions.

The dielectric covering layer according to the present invention will mostly have significantly varying thickness from one place to another due to the marked discrepancy in shape between its inner face, corresponding to the outer wall of the skeleton structure, and the outer face shaped by the inner walls of the mold. It will however even at the thinnest place in general be thicker than a conventional plurality of surface conditioning layers.

Other objects and advantages of the invention will become known by reference to the following description, claims and the accompanying drawings.

BRIEF DESCRIPTION OF THE DRAWINGS

FIG. 3 shows in a perspective view and at still greater scale a metallic skeleton structure for the lower unit of the motor according to FIGS. 1 and 2, FIG. 4a is a cross-section through the lower unit or rig of FIG. 3 along plane IV—IV of FIG. 3, FIG. 4b is a cross-section analogic to FIG. 4a through a modified embodiment, plane IV—IV of FIG. 3, FIG. 6 shows one half of a mold with a finished lower unit shown in longitudinal cross-section, FIG. 7 shows at a greater scale a detail VII from FIG. 6, FIG. 8 shows a part of a skeleton structure of a propeller of FIG. 1 according to the present invention, FIG. 9 is a cross-section along the plane IX—IX of FIG. 8, and FIG. 10 is a cross-section through another embodiment of a lower unit or rig according to the present invention.

Figure 1:
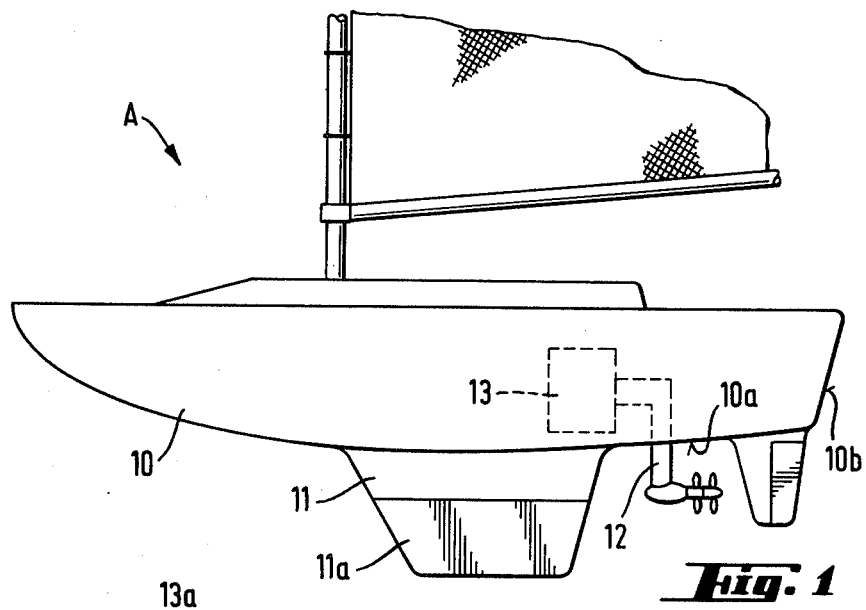
FIG. 1 shows diagramatically a sailing boat with a ballast keel and which is provided with an inboard-outboard motor having a lower unit manufactured according to the present invention.

Parts having identical or analogous functions are in all drawing figures provided with identical or analogous reference characters.

DETAILED DESCRIPTION OF THE INVENTION

According to FIG. 1, a sailing boat A has a hull 10 with a bottom 10a and a keel 11 comprising a ballast portion 11a of iron. The boat is provided with an inboard-outboard motor 13 of the so called sailing boat type (S-type), i.e. a motor the lower unit 12 of which is not attached to the transom of the boat, but penetrates through the bottom 10a of hull 10 in front of transom 10b. Said lower unit is to a great extent manufactured of aluminum material. Although as well ballast portion 11a, as lower unit 12 conventionally are coated wiht paint, it will be understood that the paint coating easily can be damaged so that metal becomes exposed and electroerosion may occur, whereby the lower unit 12 of aluminum, much more expensive than the iron ballast 11a, functions as an anode and is consumed by corrosion. Voltage values up to 90V have been measured in similar cases, and it is customary to provide special "offering anodes" to which electroerosion should concentrate in order to save more valuable parts from the attack.

Figure 2:
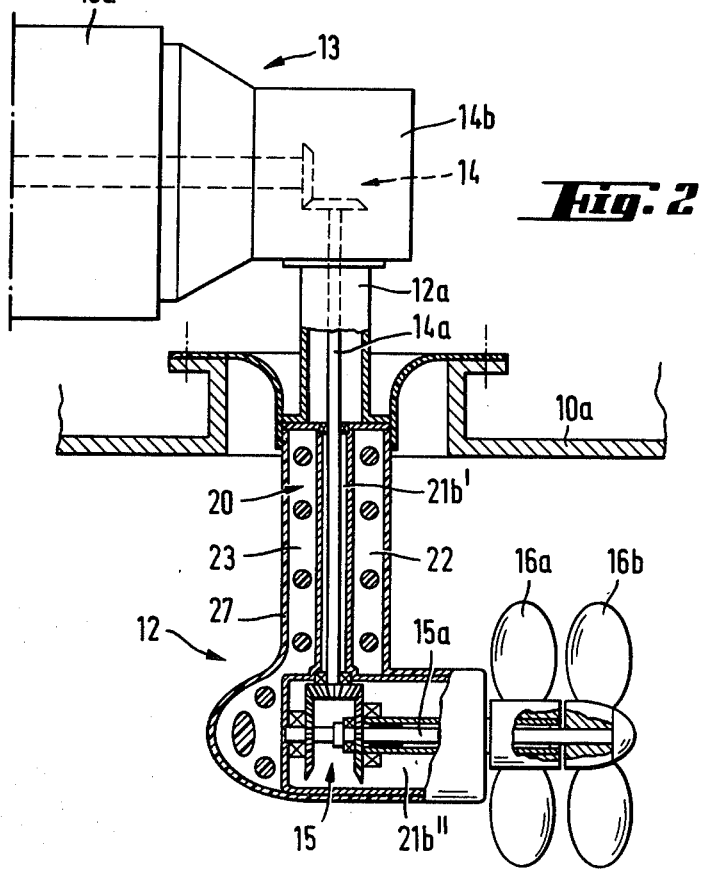
FIG. 2 shows at a greater scale and partly in longitudinal cross-section the posterior part of said inboard-outboard motor of FIG. 1.

In FIG. 2 is shown in detail how the lower unit 12 is constructed in accordance with the present invention. It comprises a metallic skeleton structure 20 which is covered by or coated with a layer or coating 27 of thermoplastic resin or vulcanized rubber-based substance. This coating will be discussed more in detail in connection with the following drawings.

According to FIG. 2, the inboard-outboard motor 13 comprises a motor unit 13a, an upper bevel gear 14 in a housing 14b, an inboard part 12a of the lower unit 12, the lower unit 12 proper placed outboard, a power transmitting shaft 14a, a lower bevel gear 15, a double propeller shaft 15a and two pusher propellers 16a, 16b rotating in opposite directions. Parts 14a, 15, 15a and such parts as exhaust conduct (not shown) etc. are accomodated within an inner cavity 21b', 21b" in the skeleton structure 27.

In FIG. 3 the skeleton structure 20 is for clarity shown covered by coating 27 only in its lower half, and the coating itself is shown as if it were transparent, which in practice generally will not be the case. According to FIGS. 3 and 4, the upper part of the skeleton structure 20 has essentially the shape of a vertical hollow cylindrical body 21 with an inner cavity 21b' and with an upper flange 21a for attachment to the aforesaid part 12a which in its turn is affixed to the housing 14b of the upper gear 14. A cooling water intake 24 may be arranged on the outside of structure 20 and also covered by the coating. From the cylindrical body 21 protrude forwardly and rearwardly fin elements 22 and 23 which have reinforced thickened edges 22a, 23a and are provided with a plurality of through-openings 22b, 23b. Said edges and openings define mechanical means promoting the adherence of coating 27 to structure 20, as will be readily recognised from the study of FIGS. 4 and 6.

The lower part of structure 20 is essentially defined by a horizontal hollow cylindrical body 21c attached at right angles to the lower end of the vertical cylindrical body 21. The cylindrical bodies 21, 21c comprise or envelop cavities 21b', 21b".

It will be readily understood that such a metallic skeleton structure 20 may be readily produced by conventional methods, such as by welding together one annular, two cylindrical, and two planar pieces defining respectively the flange, the bodies comprising the cavities, and the fin elements. It may also just as readily be manufactured by conventional molding or diecasting method with the use of only two cylindrical cores defining said cavities 21b', 21b".

From FIG. 4a is best apparent how coating 27, having markedly varying thickness, levels up the outer shape of structure 12, established with a view only to most economical production, to an overall outer shape defined by an outer face 12b which is strictly streamlined.

In FIG. 4b is shown a modification of the embodiment according to FIG. 4a with a second generally vertical hollow cylindrical body 21', parallel with and adjacent to cylindrical body 21. Cylindrical body 21' may serve e.g. as a duct for cooling water or exhaust gases or to accomodate mechanical parts etc.

It will be appreciated that also a plurality of essentially horizontal hollow cylindrical bodies, parallel with and adjacent to body 21c may be provided. There may also be provided one or more cylindrical bodies, in particular when the skeleton structure is manufactured by welding technique which are more or less arcuate having e.g. the upper end parallel with the vertical cylinder and the lower end parallel with the horizontal cylinder, and serving as ducts for water or exhaust gases.

Cylindrical body 21 is located essentially at the thickest portion of coating 27 (maximum thickness f) where also smallest wall thickness c of the coating is to be found. However, even this minimum thickness c is a multiple of the thickness of the aggregated conventional surface conditioning layers. The skeleton structure 20, and in particular the cylindrical bodies 21, 21c have generally uniform wall thickness all over. In FIG. 4a is also shown power transmitting shaft 14a which of course will be mounted first upon assembly of the whole propulsion system.

Figure 5:
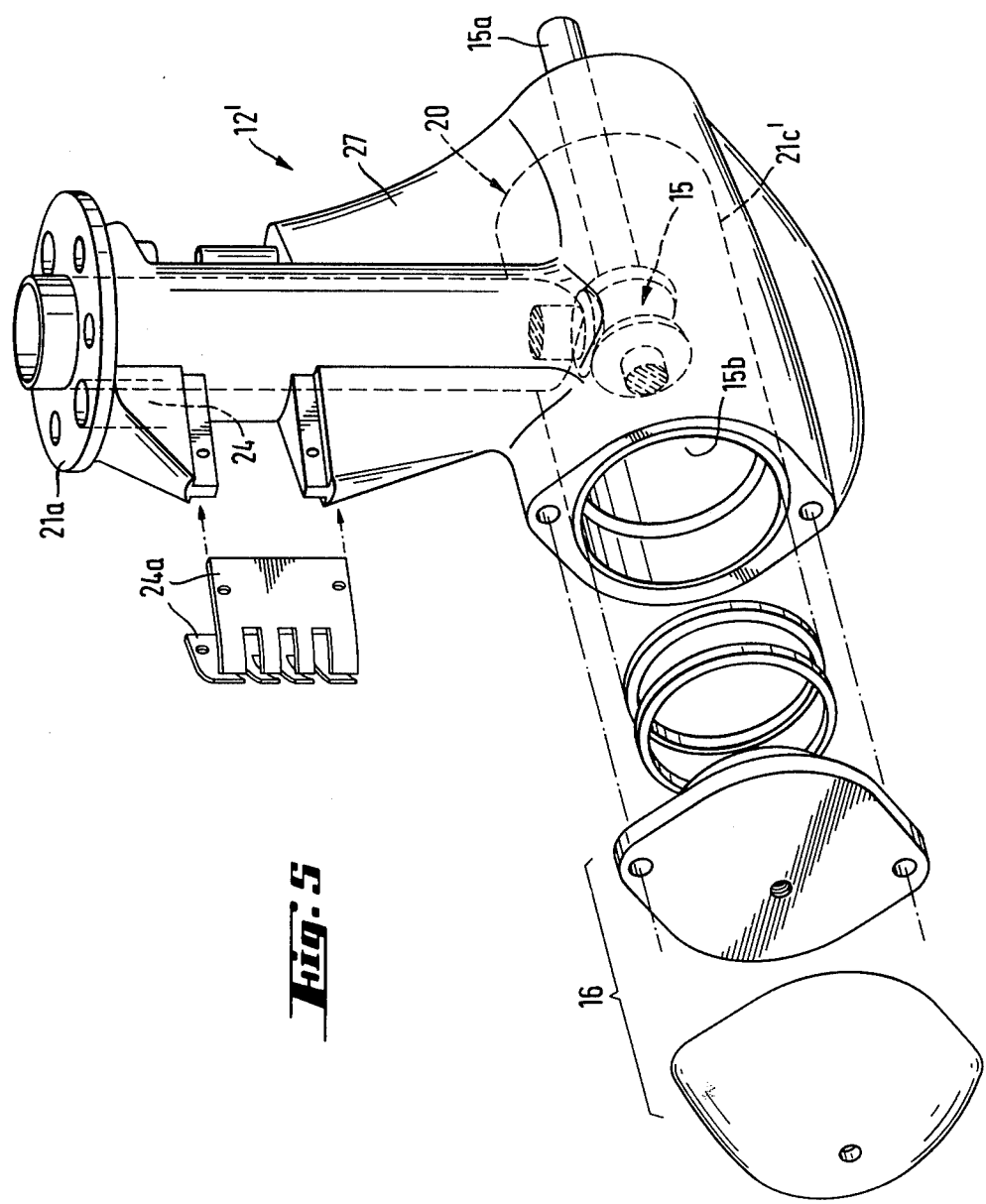
FIG. 5 is an exploded view of another embodiment of a lower unit according to the invention.

A considerable amount of heat is generated in operation in the two bevel gears 14, 15, and coating 27 insulates the structure 20 not only electrically, but also thermically. The upper gear 14 is cooled in conventional manner, not shown, by water fed-in through intake 24. As to the lower gear 15, reference is made to FIG. 5, where another embodiment of lower unit 12' is shown. There the front part of lower unit 12', or more precisely of its lower horizontal cylindrical body 21c', is left uncovered by the coating 27 and is preferably constructed as a removable cover means 16 whereby also access to the inner space 15b at the front of cavity 21b", where the lower gear 15 is located, is enabled. The cover means 16 is made of heat conducting material. Such material may also be metallic, e.g. an aluminum-bronze alloy or copper. In view of the relatively small amount of material needed for the cover means, more expensive, corrosion-proof material may be chosen, or alternatively, the cover means may constitute the earlier mentioned offer anode. Protecting guards 24a are to be mounted at the water intake 24.

According to FIG. 6, a mold for manufacturing a boat part according to the present invention may comprise two essentially identical halves such as half 30, firmly attachable one to another by convenient affixing means inserted into openings 30a. A feed-in channel 31 is provided in at least one of the halves for the supply of the material forming the coating 27 ("layer material").

Skeleton structure 20 is immediately after production (by welding, molding or diecasting) sand-blasted and provided with a ground coating e.g. by immersion in paint or by electrostatic application of a plastics layer on the heated skeleton structure. One or more primer layers, e.g. of an epoxy resin, may be applied to the surface of the skeleton structure which have such composition that they react with the layer material and bond it to the skeleton structure. Such a primer layer defines a chemical means promoting adhesion of the layer to the skeleton structure and may be obtained e.g. by coating the surface of the heated skeleton structure with a plastics powder which firmly adheres thereto and later on reacts with the layer material. If the layer material is a rubber-based substance, the skeleton structure is also sand-blasted, but possibly not provided with a ground coating. Appropriate rubber-based materials are e.g. chloroprene rubber (neoprene) and nitrile rubber, which both have good aging resistance.

Then connection faces such as edge 20a (FIG. 7), discussed more in detail later on, may be machined, and thereafter the skeleton structure 20 is inserted into the mold and is "suspended" there with the aid of sealing cores such as cores 32-34 sustaining structure 20 at places where the finished product will have openings communicating with the outside. The skeleton structure 20 of FIG. 6, consisting essentially of two cylindrical bodies, may be considered to be constructed in accordance with shell construction principles, and basically no further steps are necessary to protect it against the pressures which will develop in the mold. However, for clarity, the entire inner cavity 21b', 21b" is shown to be filled with a sandy mass 35, e.g. well shaked sand, filled in previously and now firmly plugged by said cores 32 to 34 which in their turn are secured in the mold in a manner not particularly shown in the drawing.

The layer material is fed-in through channel 31 and fills out all empty spaces around the suspended skeleton structure, inclusive the openings 22b, 23b in the fin elements 22, 23, and envelops also the thickened edges 22a, 23a.

A third fin element 28 with a thickened edge 28a and openings 28b is attached to the bottom part of structure 20.

Appropriate thermoplastic resins are e.g. soft PVC, which has a certain rubber-like character, nitryle PVC, or thermoplastic polyurethane, which is very resistant to wear even in respect of scratch and impact resistance, or a rubber-thermoplastics-alloy based thereon. Thermoplastic resin material is fed-in into the mold heated and under pressure of more than 150 kg/cm$^2$. Pressure values of appr. 500 kg/cm$^2$ are normal and up to 900 kg/cm$^2$ are possible. Temperatures between 150° C.–280° C. may occur. A coating of thermoplastic material has the advantage over a coating of rubber-based material that it readily may be repaired with the aid of an appropriate cement (solvent).

If a rubber-based coating is to be produced, the substance is fed-in into the mold in cold state and is warmed therein to be cured or vulcanized during e.g. 20 minutes. Pressure values over 150 kg/cm$^2$ develop in the mold during the curing process.

As well to thermoplastic as to rubber-based material additive substances may be added, e.g. pigments to obtain coloration, or materials effective as a cathode, such as carbon.

From the study of FIG. 7 will be apparent that the edges around the openings in skeleton structure 20, such as edge 20a, may advantageously be somewhat retracted, at least along a portion B' of their total breadth B, and be provided with a groove 20b so that the coating will form there a circumferential annulus 25 terminated by a bead 25a. Annulus 25 may of course also cover the whole breadth B, i.e. edge 20a of the structure 27B is along its entire breadth B retracted relative the sealing core 33, and constitutes a sealing means in respect of a connected part which e.g. may be affixed with the aid of a thread 26 in the inner wall of structure 20. Parts 20a, 25 and 25a define another mechanical means promoting adherence of the coating 27 to the structure 20.

After the layer material which has been fed-in into the mold has cured, by lapse of time and cooling in the case of thermoplastic resin, or by lapse of time and heating in the case of a rubber-based material, the finished product is removed from the mold. It will be perfectly finished on the outer surface, in accordance with the quality of the inner walls of the mold, and it will possibly also have a desired color.

It will be understood that the measures taken to protect the hollow skeleton structure against pressure in the mold, i.e. shell construction and/or filling up of the cavity, also are effective to neutralise the crimping pressure generated when coating 27 finally sets. This unavoidable crimping guarantees adherence of the layer to the structure even if no additional mechanical or chemical means were used.

In FIG. 8 is shown propeller 16a as an example of a boat part having a skeleton structure without any cavity. Conventionally, boat propellers are made of steel or other metals, inclusive aluminum. Aluminum propellers however cannot be used for speeds over appr. 50 km/hour due to cavitation effects. Plastics are practically not susceptible to cavitation, but as already stated, such propellers are rather instable in respect of shape. Therefore, steel propellers have conventionally been accepted as the best compromise with a view to cost and performance.

According to the present invention, a metallic skeleton structure 40, preferably of steel, is provided. Structure 40 has in the region of each propeller blade such as blade D a plurality of generally radially extending rib elements 41 which are attached to a hub or central portion 44. (Propeller blade E is shown in finished state.) Between and outside the ribs 41 extend plate-shaped portions 41a provided with a plurality of through-openings 40a having the same purpose as similar openings 22b, 23b in FIGS. 2, 3 and 6, i.e. to allow passage for the layer material when injected into the mold. It will be recognised from the drawing that the area limited by the outline of metallic skeleton structure 40 occupies at least 70% of the area of the respective propeller blade D. The interspaces between the rib elements 41 may also be left free, but it is essential that they always are at least partially penetrable for the layer material, as the case is e.g. in FIG. 8 thanks to openings 40a.

The manufacture is the same as described in connection with FIG 6. The peripheric contours 45 of the finished blade D are shown in phantom in FIG. 8 and with full lines in FIG. 9.

It is possible to use the same skeleton structure 40 for several propeller types which in minor degree differ in diameter and/or in pitch. Slight differences in pitch are the case e.g. with two propellers 16a, 16b in a double propulsion unit as shown in FIGS. 1 and 2. The same skeleton structure is inserted in different molds which of course exactly correspond to the desired final propeller shapes. It will be recognised from the phantom outline in FIG. 8 that coating 27' covers as well the blades, as the outside of the central hub portion of the propeller. The skeleton structure 40 may be readily mounted in the mold e.g. with the aid of a mandrel inserted into the opening of the hub portion instead of a future propeller shaft.

It will be readily realised from the drawings that the metallic skeleton structure always has an outer shape, defined by its outer walls, which is fully comprised within the outer shape of the final product, even if the skeleton structure possibly at some place itself defines a part of the outer shape, as is the case e.g. with the innermost portion of edge 20a in FIG. 7, not covered by annulus 25.

In FIG. 10 is shown more in detail an exemplary embodiment of a rig or lower unit according to the present invention. The unit 12' is provided for a double propeller drive and has a double propeller shaft 15a accomodated in the cavity 21b'' *defined by the horizontal hollow cylindrical body 21c.* Where the vertical cylindrical body 21 and said body 21c meet is the bevel gear 15 arranged. A second vertical cylindrical body 21' is parallel with and adjacent to body 21. In body 21' is accomodated an intake duct 121 for cooling water entering through ports 24' and in said duct is concentrically mounted a duct 122 for lubricating oil. Coating 27' has been produced at the same time as layer 27 by inserting into body 21' a core of smaller diameter than what the diameter of the cavity defined by body 21' is.

Cover means 16' provide access to gear 15 at assembly and disassembly and can be of metal or plastics.

What is claimed is:

1. A submersible lower unit of a marine propulsion assembly, comprising a rigid inner metallic skeleton non-streamlined outer surface structure including a first pressure-resistant body extending generally vertically between an upper end and a lower end opening and defining a generally cylindrical first inner cavity, a second pressure-resistant body extending generally horizontally between a forward end and a rear end opening and defining a generally cylindrical second inner cavity, said bodies and cavities being connected one with another at a place of interconnection at their said lower and forward ends and accommodating power transmission means drivable by a motor unit located adjacent said upper end, said power transmission means comprising generally vertical, rigid drive shaft means located in said first cavity, generally horizontal rigid drive shaft means located in said second cavity, and a bevel gear operatively interconnecting said vertical and horizontal drive shaft means and located at said place of interconnection, driving propeller means mounted on said horizontal driving shaft means aft of said rear end, and an outer coating of a watertight, dielectric substance on the said inner skeleton non-streamlined outer surface structure, which coating tightly envelops said structure and defines an outer final shape and face which is streamlined throughout said lower unit.

2. The unit of claim 1 further comprising at least one fin element projecting outwardly of at least one of said first and second bodies and fully embedded in said coating.

3. The unit of claim 2, wherein said fin element is provided with mechanical means for enhancing adherence of said coating thereto and including at least one opening therethrough.

4. The unit of claim 2, wherein said fin element is provided with mechanical means for enhancing adherence of said coating thereto and including at least a reinforced edge along the free edge of said fin element.

5. The unit of claim 1, wherein a connecting flange for attachment of said skeleton structure to said motor unit is provided around said upper end opening.

6. The unit of claim 1, further comprising a third body defining a cylindrical cavity for a duct or for accommodating additional mechanical components and which extends parallel with at least one of said first and second bodies and is rigidly connected to said skeleton structure.

7. The unit of claim 1, wherein said skeleton structure includes a cooling water intake.

8. The unit of claim 1, further comprising a removable cover means releasably attached to said forward end to provide access to said bevel gear.

9. The unit of claim 8, wherein said cover means includes heat conducting material uncoated by said substance to transmit heat of said bevel gear to the surrounding water.

10. The unit of claim 1, wherein around at least a portion of the edge of at least one of said openings said substance forms a circumferential annulus covering at least partially the total breadth of said edge, said annulus enhancing the adhesion of said coating substance thereto and providing sealing means for connecting another part thereto.

11. The unit of claim 1, wherein said coating substance is a thermoplastic resin.

12. The unit of claim 11, wherein at least one layer of a primer substance is provided on said skeleton structure for enhancing the adhesion of said coating substance thereto.

13. The unit of claim 12, wherein said coating substance is a cured rubber-based substance.

14. The unit of claim 12, wherein said coating substance includes an additive for rendering said outer coating a cathode.

* * * * *